US006718538B1

United States Patent
Mathiske

(10) Patent No.: US 6,718,538 B1
(45) Date of Patent: Apr. 6, 2004

(54) METHOD AND APPARATUS FOR HYBRID CHECKPOINTING

(75) Inventor: Bernd J. W. Mathiske, Santa Clara, CA (US)

(73) Assignee: Sun Microsystems, Inc., Santa Clara ( * ) Notice: Subject to any disclaimer, the term of this patent is extended or adjusted under 35 U.S.C. 154(b) by 510 days.

(21) Appl. No.: 09/652,717

(22) Filed: Aug. 31, 2000

(51) Int. Cl.[7] .................................................. G06F 9/44
(52) U.S. Cl. ....................................................... 717/129
(58) Field of Search ................................. 717/124–129; 714/27–34, 51, 2, 47; 712/227; 709/316, 328, 330, 201–203; 707/1, 101, 103 R

(56) References Cited

U.S. PATENT DOCUMENTS

| | | | | | |
|---|---|---|---|---|---|
| 5,664,090 A | * | 9/1997 | Seki et al. | ...................... | 714/15 |
| 5,748,882 A | * | 5/1998 | Huang | .......................... | 714/47 |
| 6,105,148 A | * | 8/2000 | Chung et al. | .................. | 714/16 |
| 6,161,219 A | * | 12/2000 | Ramkumar et al. | ......... | 717/130 |
| 6,397,379 B1 | * | 5/2002 | Yates et al. | .................. | 717/140 |
| 6,421,739 B1 | * | 7/2002 | Holiday | ...................... | 709/330 |

OTHER PUBLICATIONS

Jon Howell, "Straightforward Java Persistence Through Checkpointing", 1999, In Advances in Persistent Object Systems, pp. 322–334.*

* cited by examiner

*Primary Examiner*—Kakali Chaki
*Assistant Examiner*—Tuan Anh Vu
(74) *Attorney, Agent, or Firm*—Park, Vaughan & Fleming LLP

(57) ABSTRACT

The present invention provides a method and apparatus for hybrid checkpointing which captures the entire address space of a process: both language internal and language external (native) memory and program state. Initially, the invention halts a currently active process. Next, the invention gets and records the native state of a process, including threads. Next, the invention gets and records the internal state of a process and utilizes persistent object caching. Thereafter, the invention checkpoints the process. In one embodiment, the invention builds and utilizes a catalogue. The catalogue records the native and internal states from prior checkpoints. Upon the invocation of a new checkpoint, the invention accesses the catalogue and determines what native and internal states have changed since the last checkpoint. If some of the states have changed the invention updates the catalogue and only checkpoints those changed states, thereby operating more efficiently.

21 Claims, 6 Drawing Sheets

METHOD AND APPARATUS FOR HYBRID CHECKPOINTING

BACKGROUND OF THE INVENTION

1. Field of the Invention

The present invention relates to process checkpointing, and in particular to a method and apparatus for performing hybrid checkpointing.

2. Background Art

Computing environments use a technique known as "checkpointing" which involves saving the state of a program, usually to stable storage, so that it may be reconstructed later in time. Checkpointing is useful for long running computer programs, recovering from a system crash, playback debugging, process migration and job swapping, for example. A checkpoint is like a snapshot in time of the computing environment in which the program is executing. Current problems with checkpointing procedures include latency, the time it takes to store the state of the computing environment on stable storage (such as a disk drive), and the amount of storage space required for the checkpoint.

In some prior art checkpointing the data volume of a checkpoint is roughly proportional to the occupied main memory space of the respective checkpointed process. Due to the volume, such checkpointing operations have an undesirably high latency. Parallelization can improve responsiveness. For instance, UNIX™ based operating system environments provide a "fork" command. When a fork instruction is executed, the process concerned splits into a parent and child process. Both the parent and child process continue to execute independently from after the fork intruction. Using such functionality, one can simultaneously checkpoint both the parent and child processes. This type of parallelization, however, does not reduce overall resource consumption.

Internal Checkpointing

Internal checkpointing can be used to implement persistent programming languages. Persistent programming languages are languages that are extended to handle persistent data. Persistent data is data that continues to exist even after the process that created it has stopped executing. Existing persistent programming language implementations include: Napier, Tycoon, and PJama, for instance.

Persistent programming languages utilize object caches. Caches are implemented under the assumption that it is very likely that some piece of data will be repeatedly accessed. Access delays are minimized by keeping popular data close to the entity which needs it. Object caches allow for efficient internal checkpointing on a per object basis. Large amounts of memory may be checkpointed with few writes to disk. In addition, persistent programming languages can update the cache automatically. Thus, persistent programming languages implementing object caches produce relatively low data volume per checkpoint and have a short latency. In addition, persistent programming languages implementing object caches can operate when the size of the data exceeds the size of virtual memory.

Persistent programming languages with an external programming interface, however, cannot capture the entire execution state of a program. The internal execution state resides in an object heap. An object heap is an area of memory reserved for objects that are created at runtime—that is, when the program actually executes. Taking the object heap and checkpointing the objects in that heap does not allow one to checkpoint native states, such as execution threads, native functions, or memory allocation regions that are not on the object heap, but reside on other general purpose heaps. Thus, data that is outside the direct control of the given runtime system (native data) is lost. Some native data can be integrated by dedicated explicit programming in the persistent language and external languages, but this is generally not possible.

Native Checkpointing

Native checkpointing records the native state of a process to a secondary storage medium. The native state of a process comprises, for example, memory regions that have been allocated and memory mapped, the contents of those regions, (i.e., copies of the random access memory that contains those regions), active thread stacks, registers for the active threads, and kernel state, such as signal handlers and file handles and other entities that allow the operating system to support the program. Compression reduces the data volume associated with checkpointing by compressing the data that is stored.

When a checkpoint is taken, only the portion of the checkpoint that has changed since the previous checkpoint need to be saved. The unchanged portion can be restored from previous checkpoints. Incremental checkpointing usually may be implemented through the use of page protection hardware to identify the unchanged portion of the checkpoint. Saving only the changed portion reduces the size of each checkpoint, and thus the overhead of checkpointing. Old checkpoint files, however, cannot be deleted when incremental checkpointing is employed, because the program's data state is spread out over many checkpoint files. Thus, the cumulative size of incremental checkpoint files will increase at a steady rate over time, since many updated values may be saved for the same page.

Native checkpointing in a Java™ environment have been described in connection with the "icee system". The icee system is based entirely on a paging system implemented by the Solari™ version 2.5.1 operating system. (John Howell, Straightforward Java Persistence Through Checkpointing, in Advances in Persistent Object Systems, Ron Morrison, Mick Jordan, and Malcolm Atkinson, editors, pages 322–334, Morgan Kaufman, 1999. (Presented at the Third International Workshop on Persistence and Java, Sep. 1–3, 1998.) Compression and incremental techniques can take place in an infinite number of computing environments. An example of a Java technology environment where these techniques can be implemented is described below.

Java Technology Environment Example

A program which utilizes Java technology is composed of a number of classes and interfaces. Unlike many programming languages, in which a program is compiled into machine-dependent, executable program code, programs which utilize Java technology are compiled into machine independent bytecode class files. Each class contains code and data in a platform-independent format called the class file format. The computer system acting as the execution vehicle contains a program called a virtual machine, which is responsible for executing the code in classes. The virtual machine provides a level of abstraction between the machine independence of the bytecode classes and the machine-dependent instruction set of the underlying computer hardware. A "class loader" within the virtual machine is responsible for loading the bytecode class files as needed, and either an interpreter executes the bytecodes directly, or a "just-in-time" (JIT) compiler transforms the bytecodes into machine code, so that they can be executed by the processor. FIG. 1 is a block diagram illustrating a sample network application environment, for instance a Java network application environment, comprising a client platform 102 coupled over a network 101 to a server 100 for the purpose of accessing class files for execution of an application or applet.

Sample Network Application Environment

In FIG. 1, server 100 comprises development environment 104 for use in creating the class files for a given application. The development environment 104 provides a mechanism, such as an editor and an applet viewer, for generating class files and previewing applets. A set of core classes 103 comprise a library of classes that can be referenced by source files containing other/new classes. From development environment 104, one or more source files 105 are generated. Source files 105 contain the programmer readable class definitions, including data structures, method implementations and references to other classes. Source files 105 are provided to compiler 106, which compiles source files 105 into compiled ".class" files 107 that contain bytecodes executable by a virtual machine. Bytecode class files 107 are stored (e.g., in temporary or permanent storage) on server 100, and are available for download over network 101.

Client platform 102 contains a virtual machine (VM) 111 which, through the use of available native operating system (O/S) calls 112, is able to execute bytecode class files and execute native O/S calls when necessary during execution. Class files are often identified in applet tags within an HTML (hypertext markup language) document. A web server application 108 is executed on server 100 to respond to HTTP (hypertext transport protocol) requests containing URLs (universal resource locators) to HTML documents, also referred to as "web pages." When a browser application executing on client platform 102 requests an HTML document, such as by forwarding URL 109 to web server 108, the browser automatically initiates the download of the class files 107 identified in the applet tag of the HTML document. Class files 107 are typically downloaded from the server and loaded into virtual machine 111 individually as needed.

It is typical for the classes of a program to be loaded as late during the program's execution as possible; they are loaded on demand from the network (stored on a server), or from a local file system, when first referenced during the program's execution. The virtual machine locates and loads each class file, parses the class file format, allocates memory for the class's various components, and links the class with other already loaded classes. This process makes the code in the class readily executable by the virtual machine.

Checkpointing Native States in a Platform Independent Environment

In a platform independent environment, such as a Java technology environment or other suitable runtime environment, incremental techniques involve taking the underlying pages that form the address space of the program and saving those pages to disk as well as the data which describes the program state. Saving data in this manner creates a representation of what the program was doing at a specific point in time. This technique, in essence, creates a "hard copy" of the program and has the advantage (unlike persistent programming language techniques) of recording native state (i.e., what the program was doing at an operating system level).

A common incremental technique is to save only the modified virtual memory pages in a checkpoint. By saving only the modified virtual memory pages in a checkpoint, the total volume of a program is restricted to the maximum size of virtual memory, (one to two gigabytes in a 32-bit system, for example). To keep the checkpoint data volume low, such paging requires significant improvements in clustering, which do not currently exist and are not likely to be developed in a general purpose computing environment. Thus, native checkpointing is expensive and has address space limitations, whereas internal checkpointing is incomplete, as it loses native data.

SUMMARY OF THE INVENTION

The present invention provides a method and apparatus for hybrid checkpointing. Hybrid checkpointing allows for efficient checkpointing of an internal and a native state of a process. The invention eliminates the disadvantages of the prior art by capturing the entire address space of a process (i.e., both language internal and language external (native) memory and program state).

Initially, the invention halts a currently active process. Next, the invention records the native state of a process, including threads. Next, the invention records the internal state of a process and implements the benefits of persistent object caching. Thereafter, the invention checkpoints the process, and re-starts the process to execution.

In one embodiment, the invention builds and utilizes a catalogue. The catalogue records the native and internal states from prior checkpoints. Upon the invocation of a new checkpoint, the invention accesses the catalogue and determines what states have changed since the last checkpoint. If some of the states have changed the invention updates the catalogue and only checkpoints those changed states, thereby operating with enhanced efficiency. In one embodiment, the invention is configured to checkpoint a process which is executing in a platform independent environment, such as a Java technology environment.

BRIEF DESCRIPTION OF THE DRAWINGS

These and other features, aspects and advantages of the present invention will become better understood with regard to the following description, appended claims and accompanying drawings where:

DETAILED DESCRIPTION OF THE INVENTION

The invention is a method and apparatus for hybrid checkpointing. In the following description, numerous specific details are set forth to provide a more thorough description of embodiments of the invention. It is apparent, however, to one skilled in the art, that the invention may be practiced without these specific details. In other instances, well known features have not been described in detail so as not to obscure the invention.

Hybrid Checkpointing

Hybrid checkpointing is performed in one or more embodiments using a programming language implementation having exact garbage collection and support to obtain comprehensive access to all reference locations in a consistent execution state snapshot. Garbage collection is a part of a language's runtime system, or an add-on library, perhaps assisted by the compiler, the hardware, the operating system, or any combination of the three, that automatically determines what memory a program is no longer using, and recycles it for other use. The Hot-Spot™ Performance Engine and the K-Java™ Virtual Machine, for example, have such features. In addition, one or more embodiments utilize an operating system interface that allows the implementation of page based checkpointing in given programs such as virtual machines. The Solaris operating system is one example of such an operating system.

Figure 1:
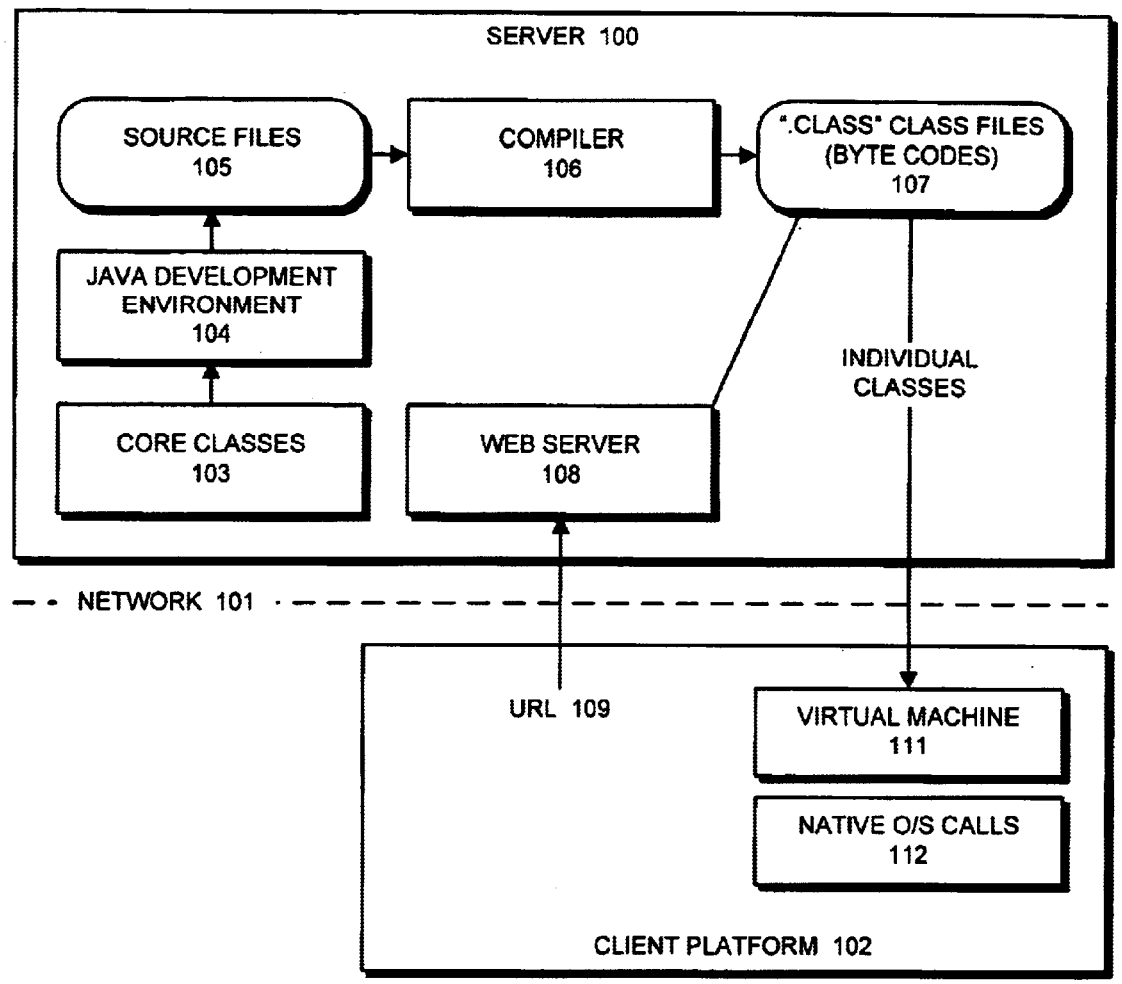
FIG. 1 is an embodiment of a network application environment.
Figure 2:
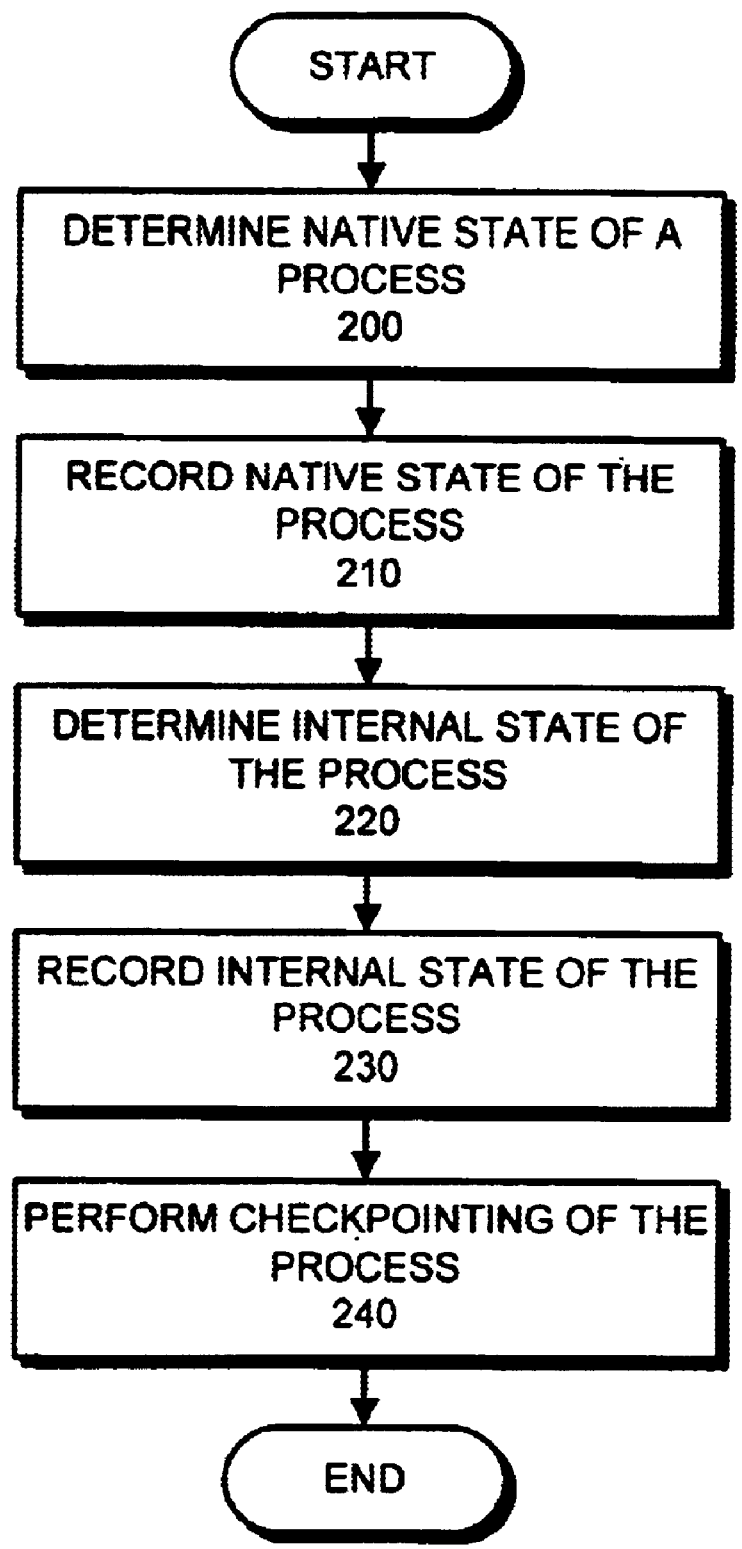
FIG. 2 is a flowchart of hybrid checkpointing in accordance with an embodiment of the present invention.

In operation, one of two scenarios most commonly invoke the hybrid checkpointing routines of the present invention. Either, a checkpoint is invoked by an application program, which calls the runtime system, or the runtime system has a background thread which is configured to checkpoint at various intervals. In either case, the invention invokes a hybrid checkpointing routine, which operates in accordance with FIG. 2.

Initially, the native state of a process is determined at step 200. Next, the native state of the process is recorded at step 210. At step 220, the internal state of a process is determined. Next, the internal state of the process is recorded at step 230. Thereafter, checkpointing of the native and internal states of the process is performed at step 240.

Hybrid Checkpointing Routine Including Catalogue Access

Figure 3:
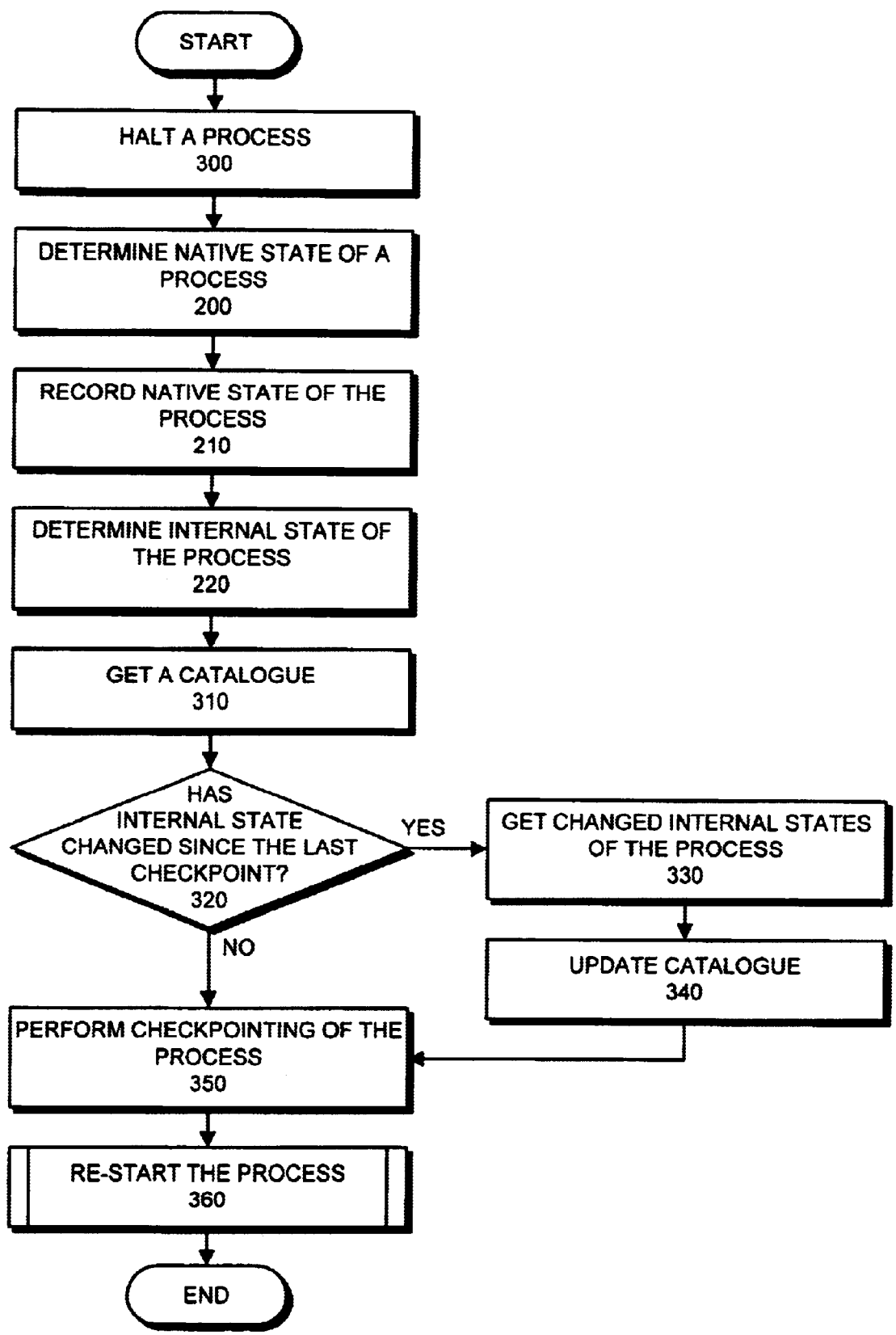
FIG. 3 is a flowchart of hybrid checkpointing with catalogue access in accordance with an embodiment of the present invention.

One embodiment of the hybrid checkpointing routine utilizes a catalogue and operates in accordance with FIG. 3. Initially, a currently active process is halted at step 300. At step 200, the native state of the process is determined. Next, the native state of the process is recorded at step 210. At step 220, the internal state of the process is determined. Next, a catalogue is obtained at step 310. Using the catalogue, it is determined whether the internal state has changed since the last checkpoint at step 320. If the internal state has changed since the last checkpoint, the changed internal states are obtained at step 330, the catalogue is updated at step 340, and the algorithm proceeds to step 350. If the internal state has not changed since the last checkpoint, the algorithm proceeds to step 350 where checkpointing is performed. Thereafter, at step 360, the process is re-started.

Embodiments of Hybrid Checkpointing in a Platform Independent Environment

Figure 4:
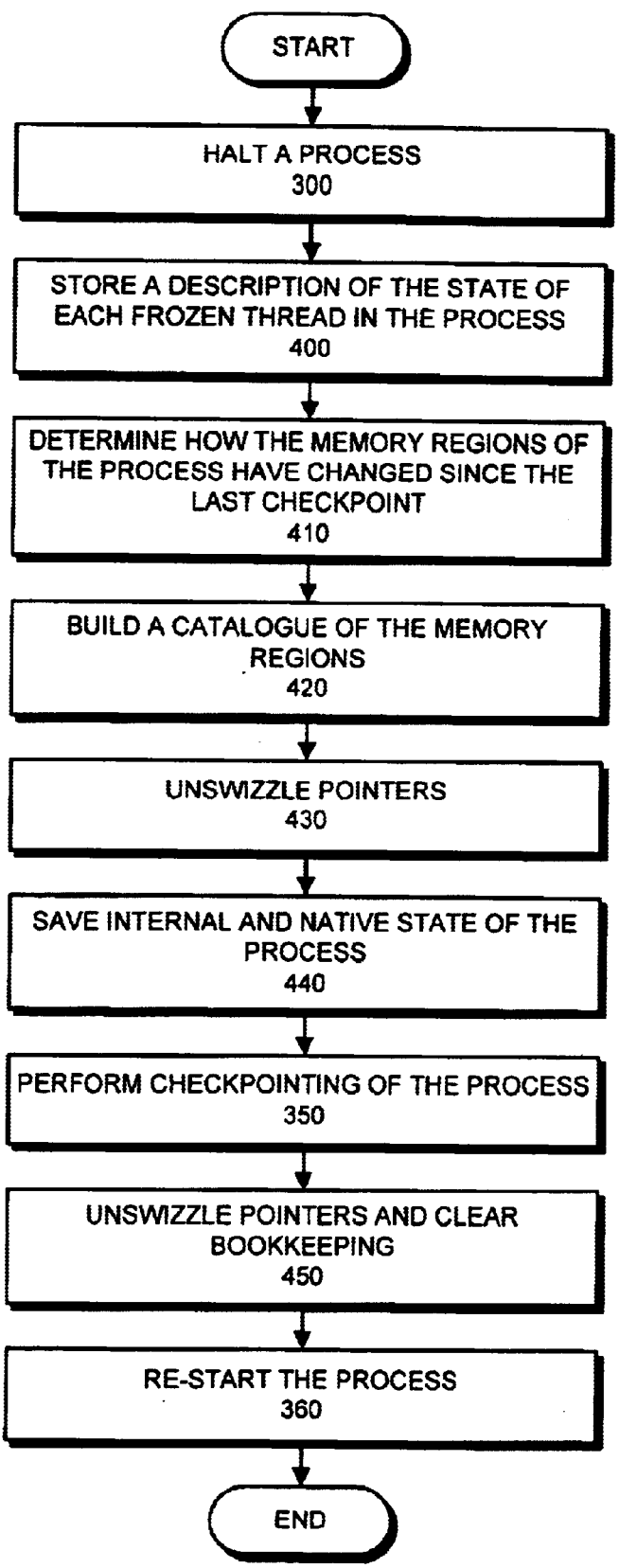
FIG. 4 is a flowchart of hybrid checkpointing in a platform independent environment in accordance with an embodiment of the present invention.

One or more embodiments of the present invention are configured to perform hybrid checkpointing in a platform independent runtime environment. These embodiments operate in accordance with FIG. 4. Initially, invention halts a currently active process 300 (e.g., by freezing all pertinent active threads, for instance). Step 300 ensures a consistent snapshot of the virtual machine and heap state.

Next at step 400, the routine stores a description of the state of each frozen thread. The description of the state of each frozen thread includes, for instance, central processing unit state, registers, and stacks for the frozen threads. At step 410, the invention determines how the memory pages of the process have changed since the last checkpoint. This is accomplished by examining how the memory pages of the process have been mapped into virtual memory, for instance by examining the memory regions of the process, and categorizing the memory regions, by determining which regions existed at start-up and have not changed, which regions comprise the garbage collected heap, which regions represent threads or have been allocated by native code, and which regions have been reserved and unused. Using these categorized regions the invention builds and stores a catalogue of the regions 420. If a checkpoint has been previously invoked, then a catalogue may already exist. In this scenario, the routine determines changes to the process memory pages since the last checkpoint.

To determine changes to the process memory pages since the last checkpoint, the invention first locates pages in the catalogue that do not pertain to the object heap (i.e., native pages). In the embodiment utilizing the Solaris operating system, specific functions within the operating system are invoked to accomplish the task of determining which pages have changed in a process. Operating systems, such as the Solaris operating system, allow the present invention to locate and store only pages that do not pertain to object heap and have changed since the last checkpoint.

What remains in memory is the object heap representing the internal state of the process. One embodiment of the invention may optionally represent in the catalogue only those objects which have changed since the last checkpoint and those objects which have been created since the last checkpoint and are pointed to by already persistent objects. In one embodiment, these stored heap objects are compressed. The locating and storing of only changed heap objects and compressing the heap objects saves considerable data volume, specifically in the cases where checkpointing occurs frequently, and hence, changes to the object heap occur relatively infrequently. Typically, one to two hundred kilobytes of memory may be saved for several gigabytes of heap.

At step 430, the routine finds and represents all object pointers in the virtual machine state from the native regions to the object heap and converts the object pointers to a format suitable for storage, termed "unswizzling". Referenced transient objects are made persistent (e.g., promoted to the persistent object store). Thereafter, the pages, including changed heap objects, native state, including operating system dependent process information, and pointers from native operations to the heap, are saved to a virtual machine checkpoint area in the store 440, which may be any computer usable storage medium, such as a hard disk drive.

At step 350, the invention checkpoints the garbage collected heap using known persistent object caching techniques. This step includes a description of the location of the virtual machine checkpoint. Alternatively, the invention may represent paged based virtual machine checkpointing in objects, thus replacing the steps of writing the changed heap objects, native state, and pointers to disk 440 and performing checkpointing 350. Thereafter, at step 450, all unswizzled pointers from native states to the object heap are "swizzled" (i.e., the pointers are re-established) and page change bookkeeping is cleared. Finally at step 360, all threads initially frozen by the routine are re-started to execution.

Re-starting Frozen Threads To Execution

Once hybrid checkpoining occurs, the threads of the halted process should be returned to their execution states.

Figure 5:
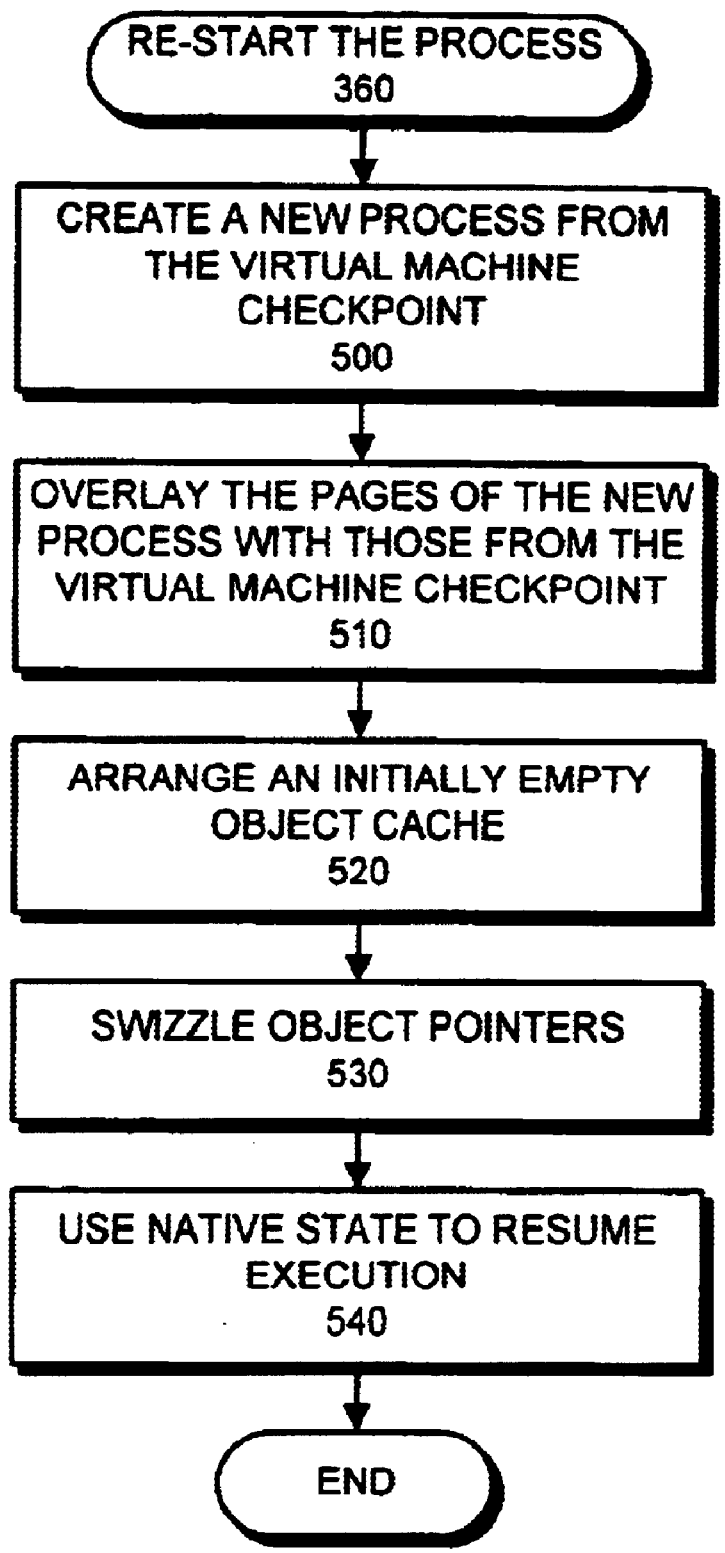
FIG. 5 is a flowchart of re-starting a frozen thread in accordance with an embodiment of the present invention.

According to one embodiment, resuming the execution of the frozen threads operates in accordance with FIG. 5. At step 500, the invention creates a new process from the virtual machine checkpoint. Next, the invention overlays the pages of the new process with the pages from the virtual machine checkpoint 510. At step 520, an initially empty object cache is arranged. Next, object pointers in the virtual machine checkpoint are swizzled, faulting objects into the object cache (heap) 530. Finally, at step 540, the operating system dependent information (native state) is used in the virtual machine checkpoint to resume execution. In one embodiment, on-line rollback is implemented, which begins with an overlay of the existing process with the pages of the virtual machine checkpoint.

Embodiment of Computer Execution Environment (Hardware)

Figure 6:
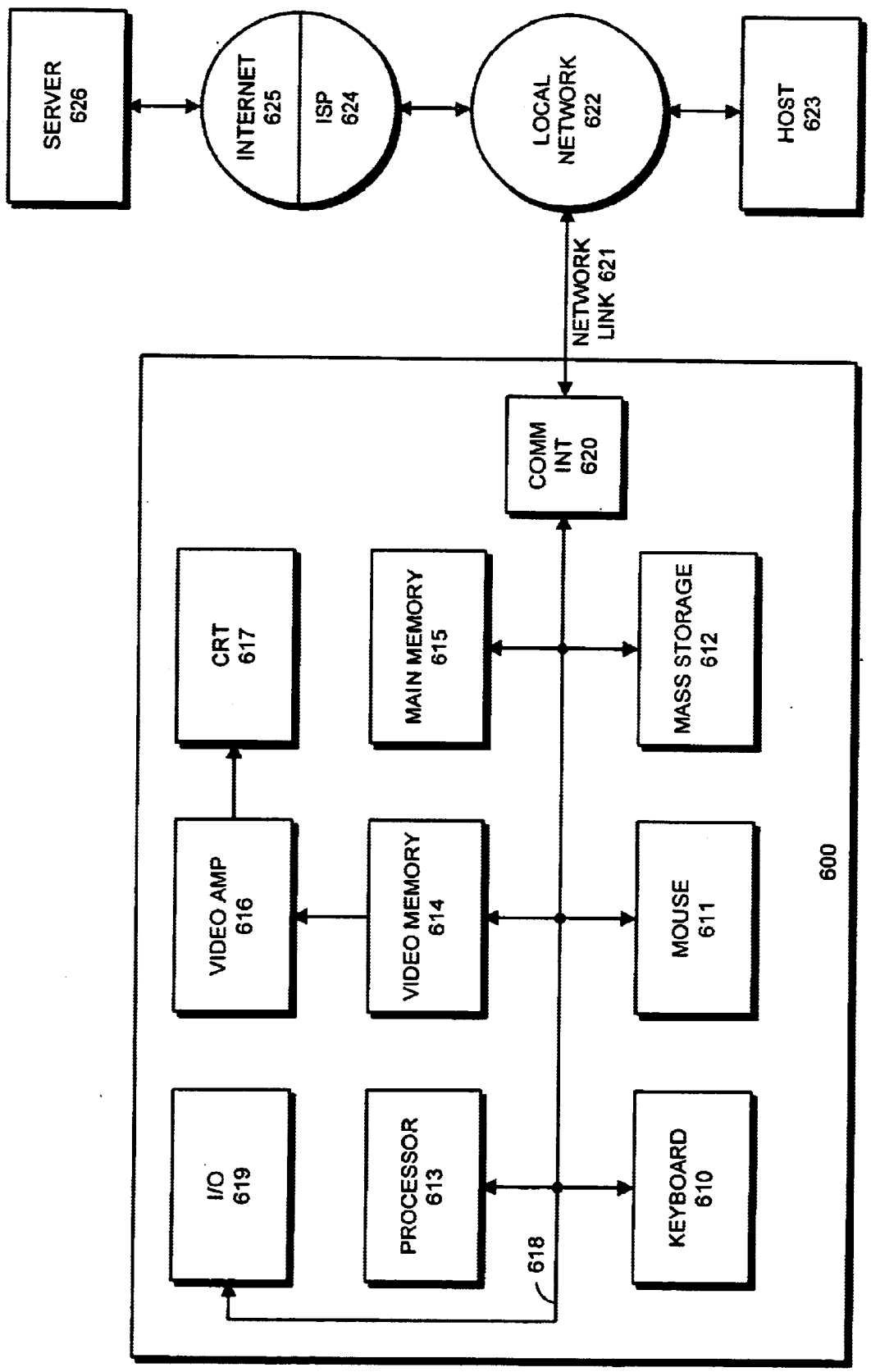
FIG. 6 is a block diagram of an embodiment of a computer system capable of providing a suitable execution environment for an embodiment of the invention.

An embodiment of the invention can be implemented as computer software in the form of computer readable program code executed in a general purpose computing environment such as environment 600 illustrated in FIG. 6, or in the form of bytecode class files executable within a Java™ run time environment running in such an environment, or in the form of bytecodes running on a processor (or devices enabled to process bytecodes) existing in a distributed environment (e.g., one or more processors on a network). A keyboard 610 and mouse 611 are coupled to a system bus 618. The keyboard and mouse are for introducing user input to the computer system and communicating that user input to central processing unit (CPU) 613. Other suitable input devices may be used in addition to, or in place of, the mouse 611 and keyboard 610. I/O (input/output) unit 619 coupled to bi-directional system bus 618 represents such I/O elements as a printer, A/V (audio/video) I/O, etc.

Computer 601 may also include a communication interface 620 coupled to bus 618. Communication interface 620 provides a two-way data communication coupling via a network link 621 to a local network 622. For example, if communication interface 620 is an integrated services digital network (ISDN) card or a modem, communication interface 620 provides a data communication connection to the corresponding type of telephone line, which comprises part of network link 621. If communication interface 620 is a local area network (LAN) card, communication interface 620 provides a data communication connection via network link 621 to a compatible LAN. Wireless links are also possible. In any such implementation, communication interface 620 sends and receives electrical, electromagnetic or optical signals which carry digital data streams representing various types of information.

Network link 621 typically provides data communication through one or more networks to other data devices. For example, network link 621 may provide a connection through local network 622 to local server computer 623 or to data equipment operated by ISP 624. ISP 624 in turn provides data communication services through the world wide packet data communication network now commonly referred to as the "Internet" 625. Local network 622 and Internet 625 both use electrical, electromagnetic or optical signals which carry digital data streams. The signals through the various networks and the signals on network link 621 and through communication interface 620, which carry the digital data to and from computer 600, are exemplary forms of carrier waves transporting the information.

Processor 613 may reside wholly on client computer 601 or wholly on server 626 or processor 613 may have its computational power distributed between computer 601 and server 626. Server 626 symbolically is represented in FIG. 6 as one unit, but server 626 can also be distributed between multiple "tiers". In one embodiment, server 626 comprises a middle and back tier where application logic executes in the middle tier and persistent data is obtained in the back tier. In the case where processor 613 resides wholly on server 626, the results of the computations performed by processor 613 are transmitted to computer 601 via Internet 625, Internet Service Provider (ISP) 624, local network 622 and communication interface 620. In this way, computer 601 is able to display the results of the computation to a user in the form of output.

Computer 601 includes a video memory 614, main memory 615 and mass storage 612, all coupled to bi-directional system bus 618 along with keyboard 610, mouse 611 and processor 613. As with processor 613, in various computing environments, main memory 615 and mass storage 612, can reside wholly on server 626 or computer 601, or they may be distributed between the two. Examples of systems where processor 613, main memory 615, and mass storage 612 are distributed between computer 601 and server 626 include the thin-client computing architecture developed by Sun Microsysterms, Inc., the palm pilot computing device and other personal digital assistants, Internet ready cellular phones and other Internet computing devices, and in platform independent computing environments, such as those which utilize the Java technologies also developed by Sun Microsystems, Inc.

The mass storage 612 may include both fixed and removable media, such as magnetic, optical or magnetic optical storage systems or any other available mass storage technology. Bus 618 may contain, for example, thirty-two address lines for addressing video memory 614 or main memory 615. The system bus 618 also includes, for example, a 32-bit data bus for transferring data between and among the components, such as processor 613, main memory 615, video memory 614 and mass storage 612. Alternatively, multiplex data/address lines may be used instead of separate data and address lines.

In one embodiment of the invention, the processor 613 is a microprocessor manufactured by Motorola, such as the 680X0 processor or a microprocessor manufactured by Intel, such as the 80X86, or Pentium processor, or a SPARC microprocessor from Sun Microsystems, Inc. However, any other suitable microprocessor or microcomputer maybe utilized. Main memory 615 is comprised of dynamic random access memory (DRAM). Video memory 614 is a dual-ported video random access memory. One port of the video memory 614 is coupled to video amplifier 616. The video amplifier 616 is used to drive the cathode ray tube (CRT) raster monitor 617. Video amplifier 616 is well known in the art and may be implemented by any suitable apparatus. This circuitry converts pixel data stored in video memory 614 to a raster signal suitable for use by monitor 617. Monitor 617 is a type of monitor suitable for displaying graphic images.

Computer 601 can send messages and receive data, including program code, through the network(s), network link 621, and communication interface 620. In the Internet example, remote server computer 626 might transmit a requested code for an application program through Internet 625, ISP 624, local network 622 and communication interface 620. The received code may be executed by processor 613 as it is received, and/or stored in mass storage 612, or other non-volatile storage for later execution. In this manner, computer 600 may obtain application code in the form of a carrier wave. Alternatively, remote server computer 626 may execute applications using processor 613, and utilize mass storage 612, and/or video memory 615. The results of the execution at server 626 are then transmitted through Internet 625, ISP 624, local network 622 and communication interface 620. In this example, computer 601 performs only input and output functions.

Application code may be embodied in any form of computer program product. A computer program product comprises a medium configured to store or transport computer readable code, or in which computer readable code may be embedded. Some examples of computer program products are CD-ROM disks, ROM cards, floppy disks, magnetic tapes, computer hard drives, servers on a network, and carrier waves.

The computer systems described above are for purposes of example only. An embodiment of the invention may be implemented in any type of computer system or programming or processing environment.

Thus, a method and apparatus for hybrid checkpointing is described in conjunction with one or more specific embodiments. The invention is defined by the claims and their full scope of equivalents.

What is claimed is:

1. A method for checkpointing a state of a process within a computer system, comprising:

dividing the state of the process into an object heap for a virtual machine, and the state of the virtual machine outside of the object heap;

performing persistent object-based checkpointing on the objects within the object heap; and performing page-based checkpointing on the state of the virtual machine outside of the object heap.

2. The method of claim 1, wherein only changes to the objects in the object heap are checkpointed.

3. The method of claim 1, further comprising:

halting the process;

performing the checkpointing operation; and resuming the process.

4. The method of claim 1, further comprising storing the state of the virtual machine and state of the objects in a catalogue.

5. The method of claim 4, further comprising accessing the catalogue to determine whether the state of the virtual machine has changes since a prior checkpointing operation.

6. The method of claim 4, further comprising accessing the catalogue to determine whether the state of the objects has changes since a prior checkpointing operation.

7. The method of claim 1, wherein the virtual machine is a Java Virtual Machine.

8. A computer-readable storage medium storing instructions that when executed by a computer cause the computer to perform a method for checkpointing a state of a process within a computer system, the method comprising:

dividing the state of the process into an object heap for a virtual machine, and the state of the virtual machine outside of the object heap;

performing persistent object-based checkpointing on the objects within the object heap; and performing page-based checkpointing on the state of the virtual machine outside of the object heap.

9. The computer-readable storage medium of claim 8, wherein only changes to the objects in the object heap are checkpointed.

10. The computer-readable storage medium of claim 8, wherein the method further comprises:

halting the process;

performing the checkpointing operation; and resuming the process.

11. The computer-readable storage medium of claim 8, wherein the method further comprises storing the state of the virtual machine and state of the objects in a catalogue.

12. The computer-readable storage medium of claim 11, wherein the method further comprises accessing the catalogue to determine whether the state of the virtual machine has changes since a prior checkpointing operation.

13. The computer-readable storage medium of claim 11, wherein the method further comprises accessing the catalogue to determine whether the state of the objects has changes since a prior checkpointing operation.

14. The computer-readable storage medium of claim 8, wherein the virtual machine is a Java Virtual Machine.

15. An apparatus for checkpointing a state of a process within a computer system, comprising:

a division mechanism configured to divide the state of the process into an object heap for a virtual machine, and the state of the virtual machine outside of the object heap;

an object-based checkpointing mechanism configured to perform persistent object-based checkpointing on the objects within the object heap; and a page-based checkpointing mechanism configured to perform page-based checkpointing on the state of the virtual machine outside of the object heap.

16. The apparatus of claim 15, wherein the object-based checkpointing mechanism is further configured to only checkpoint changes to the objects in the object heap.

17. The apparatus of claim 15, further comprising:

a process halting mechanism configured to halt the process; and a process resumption mechanism configured to resume the process after the checkpointing has occurred.

18. The apparatus of claim 15, further comprising a cataloging mechanism configured to store the state of the virtual machine and state of the objects in a catalogue.

19. The apparatus of claim 18, wherein the cataloging mechanism is further configured to access the catalogue to determine whether the state of the virtual machine has changes since a prior checkpointing operation.

20. The apparatus of claim 18, wherein the cataloging mechanism is further configured to access the catalogue to determine whether the state of the objects has changes since a prior checkpointing operation.

21. The apparatus of claim 15, wherein the virtual machine is a Java Virtual Machine.

\* \* \* \* \*